(12) United States Patent
Gillberg

(10) Patent No.: US 6,652,756 B1
(45) Date of Patent: Nov. 25, 2003

(54) METHOD OF PURIFYING SEWAGE

(75) Inventor: Lars Gillberg, Lund (SE)

(73) Assignee: Kemira Kemi AB, Helsingborg (SE)

( * ) Notice: Subject to any disclaimer, the term of this patent is extended or adjusted under 35 U.S.C. 154(b) by 0 days.

(21) Appl. No.: 09/856,194

(22) PCT Filed: Nov. 5, 1999

(86) PCT No.: PCT/SE99/02008

§ 371 (c)(1),
(2), (4) Date: Aug. 9, 2001

(87) PCT Pub. No.: WO00/32882

PCT Pub. Date: Jun. 8, 2000

(30) Foreign Application Priority Data

Nov. 18, 1998 (SE) .............................. 9803927

(51) Int. Cl.⁷ .................................. C02F 1/52
(52) U.S. Cl. .................... 210/702; 4/231; 4/DIG. 9; 210/717; 210/906
(58) Field of Search .............. 4/231, DIG. 9; 252/175, 176; 210/702, 717, 723, 724, 726, 906, 532.2

(56) References Cited

U.S. PATENT DOCUMENTS

| | | | | |
|---|---|---|---|---|
| 2,528,403 A | | 10/1950 | West | 210/6 |
| 3,604,021 A | | 9/1971 | Nolte, Jr. | 4/231 |
| 3,655,552 A | * | 4/1972 | Flock et al. | 210/728 |
| 3,844,946 A | * | 10/1974 | Farrell, Jr. | 210/104 |
| 4,116,713 A | * | 9/1978 | Otrhalek et al. | 134/3 |
| 4,132,643 A | * | 1/1979 | Hellqvist | 210/801 |
| 4,325,823 A | * | 4/1982 | Graham | 210/86 |
| 5,021,186 A | * | 6/1991 | Ota et al. | 252/186.35 |
| 5,154,830 A | * | 10/1992 | Paul et al. | 210/638 |
| 5,648,314 A | * | 7/1997 | Lachocki et al. | 504/151 |
| 6,267,882 B1 | * | 7/2001 | Houck et al. | 210/170 |

FOREIGN PATENT DOCUMENTS

| | | |
|---|---|---|
| GB | A2324083 | 10/1998 |
| SE | B8302021-4 | 9/1984 |

* cited by examiner

Primary Examiner—Peter A. Hruskoci
(74) Attorney, Agent, or Firm—Birch, Stewart, Kolasch & Birch, LLP

(57) ABSTRACT

A method of purifying sewage is described. The method relates to purifying sewage in sewage systems which comprise a toilet, by adding a precipitant for precipitation of phosphates and for binding organic substances. The method is characterized in that the precipitant is selected from the group consisting of iron salts and aluminum salts, such as sulphates, chlorides and nitrates and is adapted to be flushed with water in the toilet bowl when flushing. In the method, the sewage from the toilet is preferably conducted to a sludge separator through an outlet pipe which leads to the lower part of the sludge separator below its outlet.

7 Claims, 1 Drawing Sheet

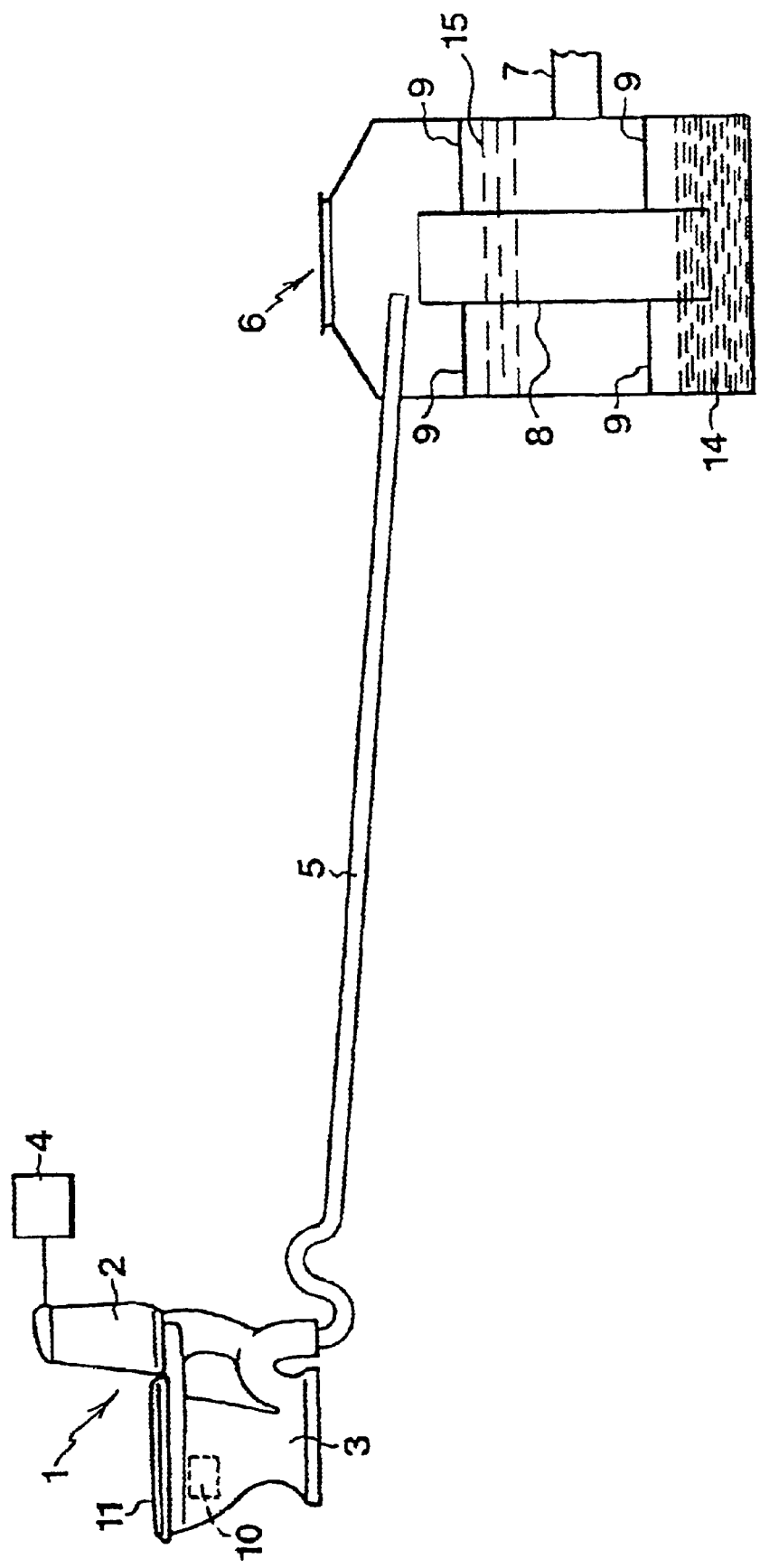

METHOD OF PURIFYING SEWAGE

This application is the national phase under 35 U.S.C. § 371 of PCT International Application No. PCT/SE99/02008 which has an International filing date of Nov. 5, 1999, which designated the United States of America and was published in English.

FIELD OF THE INVENTION

The present invention relates to a method of purifying sewage in sewage systems which comprise a toilet by adding a precipitant for precipitating phosphates.

BACKGROUND OF THE INVENTION

Leakage of phosphorus from sewage systems, particularly those that are not connected to municipal sewage systems, is a growing problem. The sludge separation in such systems as are not connected to municipal sewage systems is often formed as a two-compartment septic tank system or three-compartment septic tank system with an associated infiltration installation. The sewage system comprises at least one toilet and may also comprise outlets of washing machines, dishwashers and other sources of sewage.

It is previously known to precipitate phosphate salts from such sewage systems by means of precipitants in the form of metallic salts such as iron salts or aluminium salts. Conveniently, the salts are selected from the group consisting of sulphates, chlorides or nitrates. According to prior-art methods of precipitation, the precipitant is added to the sludge separator, for instance, by the precipitant either being provided in solid form in the sludge separator or dosed in liquid form in the sludge separator.

Such prior-art methods are associated with disadvantages. When providing a solid precipitant in the sludge separator, it can be dissolved and supplied to the outlet continuously, independently of the supply of sewage to the sludge separator, since the atmosphere in the sludge separator is saturated with water vapour that continuously can dissolve the precipitant. This implies an unnecessary high dosage of the precipitant, which entails a risk that the volume of the sludge in the sludge separator increases to such a degree that more frequent emptying intervals may be required. In time-controlled dosage of liquid precipitants, installation of electric current and of a dosing device in the sludge separator is required, which is expensive. Moreover, the time-controlled dosage occurs independently of the generation of sewage, which as in connection with the solid precipitant causes a risk of an unnecessarily high dosage of the precipitant and the volume of the sludge increasing so much that more frequent emptying intervals are required.

Consequently, there is a need for a method of precipitating phosphates and other pollutants in the sewage of sewage systems, particularly those not connected to municipal sewage treatment plants but comprising a sludge separator, for instance in the form of a two-compartment septic tank or three-compartment septic tank, and a toilet which is connected thereto, in which case the precipitation must be adapted to the supply of phosphates which is added to the sewage system.

BRIEF DESCRIPTION OF THE INVENTION

According to the invention, the above objects are achieved by a method of purifying sewage in sewage systems which comprise a toilet by adding a precipitant, characterized in. that the precipitant is selected from the group consisting of iron salts and aluminum salts and is adapted to be flushed with water in the bowl when flushing.

Further features and advantages of the invention are apparent from the dependent claims and the following description.

BRIEF DESCRIPTION OF THE DRAWINGS

FIG. 1 is a schematic of a preferred embodiment of the inventive sewage system.

DETAILED DESCRIPTION OF THE INVENTION

In the following, the invention and preferred embodiments thereof will be described with reference to the accompanying drawing which schematically shows a sewage system in which the method according to the invention can be carried out.

The drawing shows a toilet 1 with a cistern 2 and a bowl 3. The cistern 2 is provided with a flushing device 4. From the toilet 1, an outlet pipe 5 extends to a sludge separator 6, such as a three-compartment septic tank. If a two-compartment septic tank or three-compartment septic tank is used, the Figure is supposed to show the first compartment of the septic tank. The outlet pipe 5 normally leads to the-upper part of the sludge separator 6. The sludge separator 6 has an outlet 7. If the sludge separator is a two-compartment septic tank or three-compartment septic tank, the outlet 7 extends to the next compartments 15 indicates the water level of the sludge container. According to a preferred embodiment, the sludge separator has an inner pipe 8 of, for instance, plastic or metal, preferably being attached to the sludge separator 6 by means of struts 9. Reference numeral 10 designates a solid precipitant which is provided in the bowl 3. Conveniently, the precipitant 10 is suspended from the edge 11 of the bowl with the aid of a suspension means (not shown), such as a hook.

Since the precipitant, as is evident from the above description, is only dosed when flushing the toilet, an undesirable overdosage of the precipitant and thus also an undesirable increase of the volume of sludge in the sludge separator are efficiently avoided. The invention gives instead the possibility of dosing the precipitant in an amount corresponding to the amount of precipitant which is required to precipitate the phosphate contents in the sewage in each flushing operation.

If other sources of phosphates are connected to the same sludge separator, such as a washing machine, a dishwasher or the like, the dosage of the precipitant in the toilet can be adapted thereto so that the dosage of the precipitant in the toilet when flushing exceeds the amount that is required for precipitation of the phosphates in the sewage from the toilet only. The dosage of the precipitant should instead correspond to the amount that is required for precipitation of the total amount of phosphates and BOD in the sewage from the toilet and in the sewage from other sources of pollution, such as washing machines, dishwashers, sinks and the like.

The precipitant in the invention comprises an iron salt or an aluminium salt for precipitation of phosphates and oxygen-consuming substances. The iron and aluminium salts are preferably selected from the group consisting of sulphates, chlorides and nitrates. The iron salts may be iron(III) salts or iron(II) salts.

All metallic salts which are used to precipitate phosphates also precipitate particles, such as particles of organic matter, for instance, bacteria, virus and the like. By means of the invention also, inter alia, bacteria will thus be bound in the sludge and the BOD content of the outgoing water will decrease.

By using the invention, the COD content and BOD content of the outgoing sewage will thus decrease. In municipal plants which purify water by chemical purification only, more than 80% of the BOD content and about 75% of the COD content are precipitated in the incoming sewage. Corresponding figures of plants which purify water by mechanical purification only, as does a sludge separator, are about 30%.

In addition to the metallic salt, the precipitant can, if necessary or desired, also comprise perfume, colour and/or disinfectants. The type of metallic salt which is used may be adapted to the circumstances. Aluminium salts give off their colour to a smaller extent than iron salts and, thus, are to be preferred from an aesthetic point of view. However, iron salts have the advantage of stimulating the biological activity in the sludge separator. Also nitrate salts may stimulate the biological activity in such a manner that the BOD content of the outgoing water from the sludge separator decreases. Furthermore, nitrate salts may contribute to neutralise odour if any. Chloride salts have the advantage of often having a higher solubility than sulphate salts and of causing fewer clogging problems.

If the sewage system comprises more outlet points than a toilet, for instance, if it comprises outlets of washing machines, dishwashers, wash-basins, bath-tubs and/or sinks, there is a risk that emissions, rich in phosphates, from, for instance, the washing machine at times reach the sludge separator. To bind and precipitate the phosphates, a certain amount of time is required for the phosphates of the sewage rich in phosphates to bind to the hydroxides in the sludge of the sludge separator before the water flows from the sludge separator to the infiltration installation. To facilitate binding and precipitation of the phosphates, the sludge separator 6 may preferably be given the form which is shown in the drawing and which has been briefly described above.

More specifically, the incoming sewage is conducted to the sludge separator through a pipe 8 which ends a distance above the bottom of the sludge separator but below the outlet 7. By this simple measure the incoming sewage will be forced to pass the sludge 14, thus facilitating the binding of both phosphates and particles, for instance bacteria, in the incoming sewage to the iron hydroxides or aluminium hydroxides, which are found in the sludge. As shown in the Figure, the pipe 8 can be kept in place in the sludge separator 6 by means of struts 9. The struts 9 may, for instance, consist of two tubes which are screwed together or of tubes which abut against the walls of the sludge separator by a spring mechanism (not shown). If required, an extension pipe is mounted on the inlet pipe 5 so that the incoming sewage flows down into the pipe 8.

In another somewhat simpler alternative, instead of extending the pipe 8 and the struts 9, the pipe 5 is extended so that it ends between the bottom and the outlet 7 of the sludge separator.

The invention has been described above with reference to the accompanying drawing and specific, preferred embodiments, but it will be appreciated that the invention is not limited thereto and can be varied within the scope of the appended claims.

What is claimed is:

1. A method of purifying sewage including phosphates in sewage systems which comprise a toilet (1) and sludge separator (6), said method comprises adding a precipitant selected from the group consisting of iron salts and aluminum salts, to said sewage during a flushing of water in a bowl (3) of said toilet, conducting the sewage, water, and precipitant to the sludge separator (6) through an outlet pipe (5) which leads to the sludge separator (6), to precipitate the phosphates and bind the phosphates to hydroxide in sludge separated from water in said sludge separator (6).

2. A method as claimed in claim 1, characterized in that the precipitant is solid and suspended from an edge (11) of the toilet.

3. A method as claimed in claim 1, characterized in that the precipitant is liquid and is dosed in the bowl (3) when flushing.

4. A method as claimed in claim 3, characterized in that the dosage is affected by activation of a flushing device (4) of the toilet or by a water level sinking when flushing.

5. A method as claimed in any one of the preceding claims, characterized in that the sewage from the toilet (1) is conducted to the sludge separator through the outlet pipe (5) which leads to the lower part of the sludge separator (6) below a water outlet (7) of the sludge separator (6).

6. A method as claimed in claim 1, characterized in that the iron salts and aluminum salts are selected from the group consisting of sulphates, chlorides and nitrates.

7. A method as claimed in claim 1, characterized in that the precipitant is dosed in an amount exceeding that required for precipitation of phosphates in the sewage from the toilet (1).

\* \* \* \* \*